UNITED STATES PATENT OFFICE.

KAZUE AKASHI, OF TOKYO, JAPAN.

SOLID INK.

1,325,971.     Specification of Letters Patent.     Patented Dec. 23, 1919.

No Drawing.     Application filed November 14, 1917. Serial No. 201,994.

*To all whom it may concern:*

Be it known that I, KAZUE AKASHI, a subject of the Emperor of Japan, residing at No. 2 Shichikencho, Asakusaku, Tokyo, Japan, have invented certain new and useful Improvements in Solid Ink, of which the following is a specification.

The present invention relates to a solid ink made of a mixture of a suitable dye with dextrin, soluble gum tragacanth, thymol and lactic acid, the mixture being sufficiently kneaded together by the addition of a small quantity of water so as to produce a plastic or pasty substance. The percentage of each of these raw materials may of course be varied according to the kind of dye employed, but generally the following will give good result for the purpose:

| Ingredient | Amount |
|---|---|
| Dye | 25 parts by weight. |
| Dextrin | 5 " " " |
| Gum tragacanth | 4 " " " |
| Thymol | 3 " " " |
| Lactic acid | 4 " " " |

As to dye, any kind of coloring matter for usual writing ink may be employed. One actual example for manufacturing blue ink is given in the following table:

| Ingredient | Amount |
|---|---|
| Methylene blue | 25 parts by weight. |
| Dextrin | 5 " " " |
| Gum tragacanth | 4 " " " |
| Thymol | 2 " " " |
| Lactic acid | 3 " " " |

I am aware of the so-called solid ink made of a mixture of dye with dextrin, gum tragacanth and a suitable antiseptic agent. The dextrin and gum tragacanth are used for the purpose of solidifying the product and adjusting the adhesive and coating substance and also the brilliancy of the color of the ink made thereof. But such a known ink cannot be stored for long time without being dried up, and becomes very hard and soluble only with difficulty. On the contrary, the solid ink made according to this invention is characterized by the fact that it contains thymol and lactic acid, and does not dry up to an undesired extent.

Thymol, when used without lactic acid, is not soluble in water, but when used with the acid, this can dissolve in water very easily. Therefore the solid or plastic ink made of the kneaded mixture of the said constituents can dissolve in water very easily, and does not precipitate nor change color at all. Thymol serves very efficiently to prevent the product drying up or absorbing moisture so that it can retain a proper hardness permanently. Moreover, lactic acid, besides serving as an antiseptic, will also coact with thymol for the prescribed purpose. Therefore while the mass of this ink may become hard at the outer surface when stored for years, the inner part thereof retains a pasty or plastic condition and never gets too dry nor becomes hard. When put into water, this gives at once a liquid ink clearly colored corresponding to the coloring matter employed. Briefly the solid ink according to this invention has special merits of being safely stored permanently in a pasty or plastic state or in proper hardness without any fear of excessive drying, rotting or deliquescing or the like.

I claim:

A solid ink containing as its essential constituents, a soluble dye, together with dextrin, gum tragacanth, thymol and lactic acid, the mixture being rendered kneadable by the addition of a small quantity of water.

In testimony whereof I have hereunto set my hand in presence of two subscribing witnesses.

KAZUE AKASHI.

Witnesses:
SUGAO SOGA,
GENJI KURIBARA.